United States Patent
Degeling et al.

(10) Patent No.: US 8,529,391 B2
(45) Date of Patent: Sep. 10, 2013

(54) GEAR TRAIN FOR A WIND TURBINE

(71) Applicants: Markus Degeling, Rhede (DE); Manfred Möllers, Bocholt (DE)

(72) Inventors: Markus Degeling, Rhede (DE); Manfred Möllers, Bocholt (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/679,320

(22) Filed: Nov. 16, 2012

(65) Prior Publication Data

US 2013/0130858 A1 May 23, 2013

(30) Foreign Application Priority Data

Nov. 17, 2011 (EP) .................................. 11 189 480

(51) Int. Cl.
*F16H 57/04* (2010.01)

(52) U.S. Cl.
USPC .......................................................... 475/159

(58) Field of Classification Search
USPC ........................................................ 475/159
See application file for complete search history.

(56) References Cited

U.S. PATENT DOCUMENTS

| 8,128,525 B2 | 3/2012 | Dinter et al. |
| 2010/0007151 A1* | 1/2010 | Ciszak et al. ................... 290/55 |
| 2010/0056315 A1* | 3/2010 | Scholte-Wassink .......... 475/159 |

FOREIGN PATENT DOCUMENTS

| DE | 10260132 A1 | 7/2004 |
| EP | 2199607 A2 | 6/2010 |
| EP | 2280193 A2 | 2/2011 |

* cited by examiner

*Primary Examiner* — Edwin A Young
(74) *Attorney, Agent, or Firm* — Henry M Feiereisen LLC

(57) ABSTRACT

A gear train includes at least one planetary gear stage and one gear train stage. One end of a sun shaft of the planetary gear stage is concentrically surrounded by a hollow shaft of the second gear train stage. The sun shaft of the planetary gear stage is co-rotationally coupled to the hollow shaft by a denture clutch. A lubricant feed ring is arranged at a front face of the hollow shaft facing toward the sun gear of the planetary gear stage and has a cone-shaped passage opening, which has an internal diameter which decreases in the direction of the sun gear of the planetary gear stage, and concentrically surrounds the sun shaft of the planetary gear stage. At least one lubricant feed nozzle is aligned with a circumferential gap between the lubricant feed ring and the sun shaft of the planetary gear stage.

10 Claims, 2 Drawing Sheets

GEAR TRAIN FOR A WIND TURBINE

CROSS-REFERENCES TO RELATED APPLICATIONS

This application claims the priority of European Patent Application, Serial No. EP 11189480.4, filed Nov. 17, 2011, pursuant to 35 U.S.C. 119(a)-(d), the disclosure of which is incorporated herein by reference.

BACKGROUND OF THE INVENTION

The present invention relates to a gear train for a wind turbine.

The following discussion of related art is provided to assist the reader in understanding the advantages of the invention, and is not to be construed as an admission that this related art is prior art to this invention.

A planetary gear train for a wind turbine having a planetary gear stage revolving in a gear train housing is known from DE 102 60 132 A1. The planetary gear stage includes a planetary carrier which is connected to a rotor and has two side cheeks connected to one another by means of webs. In addition the planetary gear stage includes a plurality of planetary gears mounted in the planetary carrier by way of planetary gear bearings. The planetary gears are in engagement on one side with a central sun gear and on the other side with an annulus gear that is fixedly connected to the gear train housing. An insert ring through which an oil feed channel passes is fixedly arranged in the gear train housing. The oil feed channel of the insert ring is connected at a first end to an oil inlet which is routed through a wall of the gear train housing and connected to an oil feed pump. At a second end the oil feed channel is connected by way of an annular groove to a plurality of oil feed channels which are routed through one of the side cheeks of the planetary carrier. Each of the oil feed channels in the side cheek of the planetary carrier terminates at a mating face between spindles of the planetary gears and the planetary carrier. Oil feed channels are routed through the spindles of all of the planetary gears; said oil feed channels are connected to the oil feed channels in the planetary carrier and are open in the direction of the planetary gear bearings.

EP 2 199 607 A2 contains a description of a planetary gear train for a wind turbine which is based on the planetary gear train known from DE 102 60 132 A1 and which includes a first and second planetary gear stage. In order to supply oil to planetary gear bearings, a first oil feed channel is provided which is connected at a first end to an oil inlet routed through a wall of a gear train housing and connected to an oil feed pump. At a second end the first oil feed channel is connected by way of second oil feed channels which are routed through a side cheek of a planetary carrier of the planetary gear stage to third and fourth oil feed channels which are routed through spindles of all of the planetary gears of the planetary gear stage and are open in the direction of the planetary gear bearings. The first oil feed channel passes through an insert device which is fixedly arranged in the gear train housing and has an axial as well as a radial section. The second oil feed channels extend inside the side cheek of the planetary carrier of the planetary gear stage from a first annular groove. The first annular groove is cut into a radial end face of the side cheek and into the axial section of the insert device. Each of the second oil feed channels terminates at a mating face between spindles of the planetary gears and the planetary carrier of the planetary gear stage in a third annular groove. The third annular groove is connected to the third and fourth oil feed channels inside the spindles of all of the planetary gears of the planetary gear stage.

The insert device of the planetary gear train described in EP 2 199 607 A2 additionally includes a radial stator having an axial bush which is arranged radially between the planetary carrier of the planetary gear stage and a planetary carrier of the second planetary gear stage. A second annular groove is cut into the axial bush and into a radial end face of the planetary carrier of the second planetary gear stage. Fifth oil feed channels, each terminating in a fourth annular groove, pass through the planetary carrier of the second planetary gear stage. The fourth annular groove is cut into a radial end face of spindles of the planetary gears of the second planetary gear stage and is connected to sixth and seventh oil feed channels. The sixth and seventh oil feed channels are routed through the spindles of the planetary gears of the second planetary gear stage and are open in the direction of the planetary gear bearings.

A planetary gear train having an annulus gear, a plurality of planetary gears mounted in a planetary gear carrier and a sun gear, as well as a drive shaft and a driven shaft, is known from EP 2 280 193 A2. A denture clutch which is coupled to the sun gear and arranged in a gear train housing is provided in addition, the tooth system of said denture clutch being enclosed by an at least axially displaceable clutch sleeve. Arranged in the clutch sleeve is a lubricant feed channel which terminates at a section of the clutch sleeve that faces toward the tooth system of the denture clutch. A pipe expansion joint attached to the lubricant feed channel is connected to the clutch sleeve. The pipe expansion joint connects the lubricant feed channel and a lubricant supply channel which is provided in a shaft that is rotatably movable with the denture clutch.

It would therefore be desirable and advantageous to provide an at least two-stage gear train having a reliable lubricant supply for a denture clutch coupling the two gear train stages to one another.

SUMMARY OF THE INVENTION

According to one aspect of the present invention, a gear train has at least one planetary gear stage which includes an annulus gear, a plurality of planetary gears mounted in a planetary carrier, and a sun gear, as well as a gear train stage. Also provided is a gear train housing enclosing the planetary gear stage and second gear train stage. A drive shaft which can be connected to a rotor hub is co-rotationally coupled to a planetary carrier of a planetary gear stage on the drive side, while a driven shaft which can be connected to a generator is co-rotationally coupled to a toothed gearwheel of a gear train stage on the driven side. In this arrangement the planetary gear stage can be for example the drive-side planetary gear stage, while the gear train stage can be the driven-side gear train stage. The sun gear of the planetary gear stage is arranged at a first end of a sun shaft of the planetary gear stage. At its second end the sun shaft of the planetary gear stage is concentrically surrounded by a hollow shaft of the gear train stage. The sun shaft of the planetary gear stage is co-rotationally coupled to the hollow shaft by means of a denture clutch, the tooth system of which is arranged inside the hollow shaft. The tooth system can be embodied for example as involute splines. A lubricant feed ring is arranged at a front face of the hollow shaft facing toward the sun gear of the planetary gear stage. The lubricant feed ring has a cone-shaped passage opening, the internal diameter of which decreases in the direction of the sun gear of the planetary gear stage, and concentrically surrounds the sun shaft of the planetary gear stage. Provided in addition is at least one lubricant feed nozzle aligned with a circumferential gap between the lubricant feed ring and the sun shaft of the planetary gear stage for the purpose of supplying lubricant to the denture clutch. Owing to the decreasing internal diameter of the cone-shaped passage opening in the direction of the sun gear of the planetary gear stage, an improved lubricant supply to the denture clutch is produced.

If the lubricant feed ring has a section widening in the direction of the denture clutch at its cone-shaped passage opening, it can be ensured thereby that lubricant injected into the gap between the lubricant feed ring and the sun shaft of the planetary gear stage is reliably and effectively conveyed in the direction of the denture clutch. Problems due to insufficient lubricant flow to and through the denture clutch can be avoided as a result, in particular as opposed to a lubricant feed ring which has a cone-shaped passage opening having a taper in the direction of the denture clutch.

According to a preferred embodiment of the present invention the planetary gear stage and second gear train stage have a shaft orientation that is inclined downward toward a driven-side end with respect to an installation surface. This results in a further improvement in the conveyance of lubricant injected into the gap between the lubricant feed ring and the sun shaft of the planetary gear stage.

The denture clutch is preferably formed by means of an external tooth system on the sun shaft of the planetary gear stage and by means of an internal tooth system on the hollow shaft. A particularly compact structural design is realized in this way.

According to a particularly preferred development of the present invention an insert ring through which a lubricant distribution channel passes is arranged in the gear train housing concentrically with the sun shaft of the planetary gear stage. The lubricant distribution channel is connected on one side to a lubricant pump and on the other side to lubricant feed channels in the planetary carrier of the planetary gear stage. Accordingly the lubricant feed nozzle can advantageously be mounted on the insert ring and have a connection to the lubricant distribution channel. This enables an easy-to-implement and extremely reliable lubricant feed to the denture clutch.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
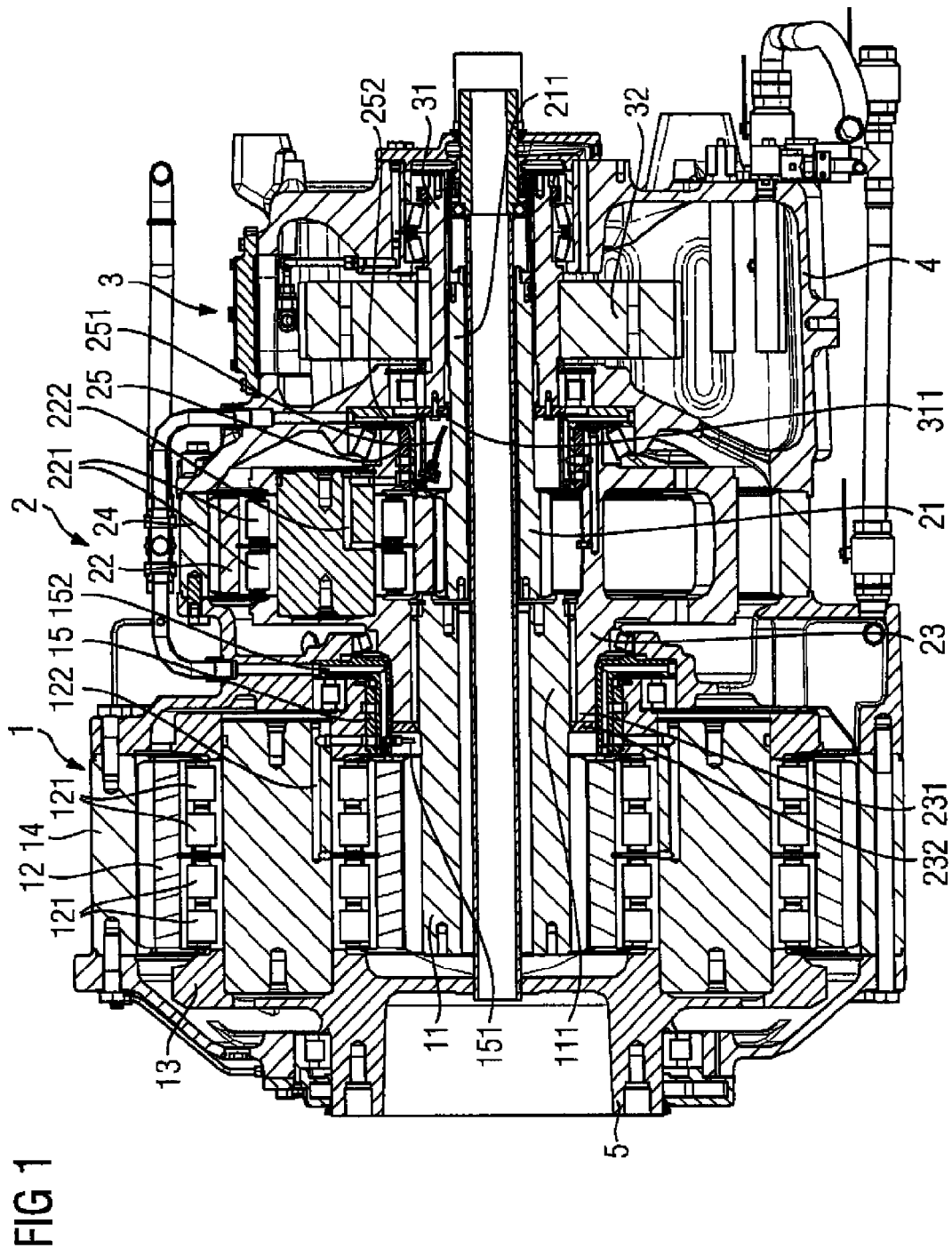
FIG. 1 shows a cross-sectional view of a three-stage gear train for a wind turbine.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a gear train which includes a drive-side planetary gear stage 1, a following middle planetary gear stage 2 and a driven-side spur gear stage 3 which are arranged in a gear train housing 4. A drive shaft 5 which can be connected to a rotor hub and a driven shaft 6 which can be connected to a generator are mounted in the gear train housing. The drive shaft 5 is coupled to a planetary carrier 13 of the planetary gear stage 1 on the drive side, while the driven shaft 6 is coupled to a spur pinion 33 of the spur gear stage 3 on the driven side (see FIG. 2).

The two planetary gear stages 1, 2 each include an annulus gear 14, 24, a plurality of planetary gears 12, 22 mounted in a planetary carrier 13, 23, and a sun gear 11, 21. In this arrangement the drive shaft 5 is integrally formed as a single piece with the planetary carrier 13 of the drive-side planetary gear stage 1. A sun shaft 111 co-rotationally coupled to the sun gear 11 of the drive-side planetary gear stage 1 is connected to the planetary carrier 23 of the middle planetary gear stage 2 by way of an involute spline clutch. A hollow shaft 231 which concentrically surrounds an end section of the sun shaft 111 of the drive-side planetary gear stage 1 is integrally formed as a single piece with the planetary carrier 23 of the middle planetary gear stage 2. The involute spline clutch between the two planetary gear stages 1, 2 is in this case formed by an external tooth system on the sun shaft 111 of the drive-side planetary gear stage 1 and by an internal tooth system on the hollow shaft 231 on the planetary carrier 23 of the middle planetary gear stage 2.

In addition to the spur pinion 33 the spur gear stage 3 includes a spur gear 32 cogging therewith and a hollow shaft 31 which is concentrically surrounded by the spur gear 32 and co-rotationally coupled thereto. A sun shaft 211 co-rotationally coupled to the sun gear 21 of the middle planetary gear stage 2 is connected by way of an involute spline clutch to the hollow shaft 31 of the spur gear stage 3 which concentrically surrounds an end section of the sun shaft 211. The involute spline clutch between the middle planetary gear stage 2 and the spur gear stage 3 is in this case formed by means of an external tooth system on the sun shaft 211 of the middle planetary gear stage 2 and by means of an internal tooth system on the hollow shaft 31 of the spur gear stage 3.

A lubricant feed ring 232 which concentrically surrounds the sun shaft 111 is arranged on a front face of the hollow shaft 231 facing toward the sun gear 11 of the drive-side planetary gear stage 1 on the planetary carrier 23 of the middle planetary gear stage 2. Said lubricant feed ring 232 has a cone-shaped passage opening, the internal diameter of which decreases in the direction of the sun gear 11 of the drive-side planetary gear stage 1. At least one lubricant feed nozzle 151 is aligned with a circumferential gap between the lubricant feed ring 232 and the sun shaft 111 for the purpose of supplying lubricant to the involute spline clutch between the two planetary gear stages 1, 2. At its cone-shaped passage opening the lubricant feed ring 232 has a section widening in the direction of the involute spline clutch. Lubricant injected into the gap between the lubricant feed ring 232 and the sun shaft 111 of the drive-side planetary gear stage 1 is conveyed through said widened section in the direction of the involute spline clutch.

A fixed insert ring 15 is also arranged concentrically with the sun shaft 111 of the drive-side planetary gear stage 1 in the gear train housing 4. A lubricant distribution channel 152 passes through said insert ring 15. The lubricant distribution channel 152 is connected on one side to a lubricant pump and on the other side to lubricant feed channels 122 in the planetary carrier 13 of the drive-side planetary gear stage 1. The lubricant feed channels 122 in the planetary carrier 13 terminate at lubricant feed points for bearings 121 of the planetary gears 12 of the drive-side planetary gear stage 1. The lubricant feed nozzle 151 for the involute spline clutch between the two planetary gear stages 1, 2 is also mounted on the insert ring 15. In this arrangement the lubricant feed nozzle 151 has a connection to the lubricant distribution channel 152 in the insert ring 15.

Figure 2:
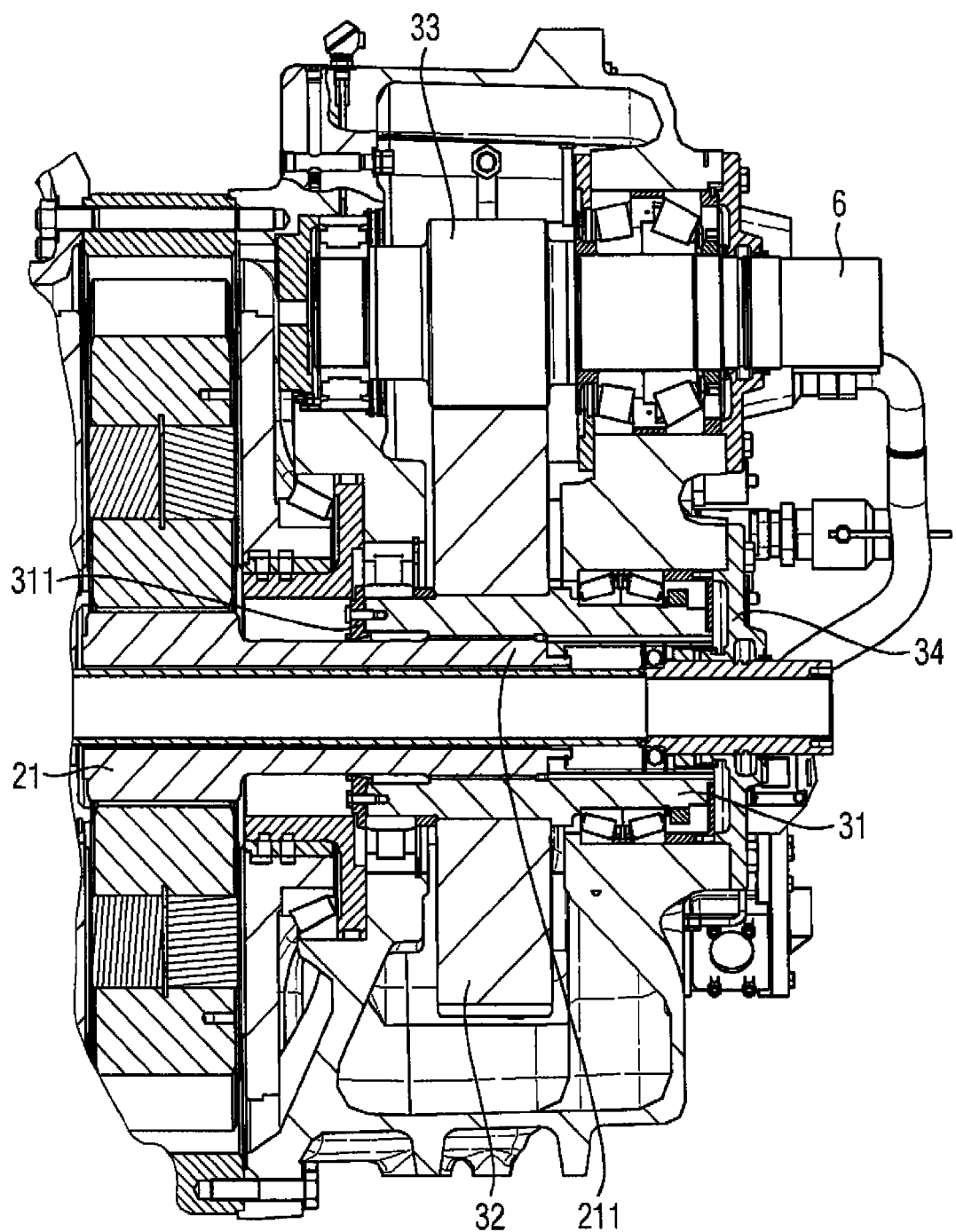
FIG. 2 shows a cross-sectional view of a denture clutch between a sun shaft of a planetary gear stage and a hollow shaft of a driven-side spur gear stage of the gear train shown in FIG. 1.

It can be seen from the detailed view in FIG. 2 that, analogously to the involute spline clutch between the two planetary gear stages 1, 2, a lubricant feed ring 311 is also arranged at a front face of the hollow shaft 31 of the spur gear stage 3 facing toward the sun gear 21 of the middle planetary gear stage 2. Said lubricant feed ring 311 concentrically surrounds the sun shaft 211 of the middle planetary gear stage 2 and has a cone-shaped passage opening, the internal diameter of which decreases in the direction of the sun gear 21. At least one lubricant feed nozzle 251 is aligned with a circumferential gap between the lubricant feed ring 311 and the sun shaft 211 for the purpose of supplying lubricant to the involute spline clutch between the middle planetary gear stage 2 and the spur gear stage 3. At its cone-shaped passage opening the lubricant feed ring 311 has a section widening in the direction of the involute spline clutch. Analogously to the above description, lubricant injected into the gap between the lubricant feed ring 311 and the sun shaft 211 of the middle planetary gear stage 2 is conveyed through said widened section in the direction of the involute spline clutch.

A fixed insert ring 25 which is arranged concentrically with the sun shaft 211 in the gear train housing 4 is also provided for the middle planetary gear stage 2. The insert ring 25 of the middle planetary gear stage 2 has passing through it a lubricant distribution channel 252 which is connected on one side to the lubricant pump and on the other side to lubricant feed channels 222 in the planetary carrier 23 of the middle planetary gear stage 2. The lubricant feed channels 222 in the planetary carrier 23 terminate at lubricant feed points for bearings 221 of the planetary gears 22 of the middle planetary gear stage 2. The lubricant feed nozzle 251 for the involute spline clutch between the middle planetary gear stage 2 and the spur gear stage 3 is also mounted on the insert ring 25. The lubricant feed nozzle 251 is in this case attached to the lubricant distribution channel 252 in the insert ring 25. A further improvement in the lubricant supply to the involute spline clutches is moreover produced if the two planetary gear stages 1, 2 and the spur gear stage 3 have a shaft orientation inclined downward toward a driven-side end with respect to an installation surface.

After passing through the involute spline clutch between the middle planetary gear stage 2 and the spur gear stage 3, supplied lubricant is conducted through a plurality of axial boreholes in the hollow shaft 31 of the spur gear stage 3 into a bearing cover 34 on the driven side.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A gear train for a wind turbine, comprising:
    at least one planetary gear stage arranged at a drive side of the gear train and comprising an annulus gear, a planetary carrier, a plurality of planetary gears mounted in the planetary carrier, a sun gear and a sun shaft; said sun gear being arranged at an end of the sun shaft;
    a gear train stage arranged at a driven side of the gear train and comprising a hollow shaft, wherein the hollow shaft surrounds another end of the sun shaft of the at least one planetary gear stage;
    a gear train housing enclosing the at least one planetary gear stage and the gear train stage;
    a drive shaft connectable to a rotor hub, said drive shaft being co-rotationally coupled to the planetary carrier of the at least one planetary gear stage;
    a driven shaft connectable to a generator, said driven shaft being co-rotationally coupled to a toothed gearwheel of the gear train stage;
    a denture clutch having a tooth system and co-rotationally coupling the sun shaft of the at least one planetary gear stage to the hollow shaft, said tooth system being arranged inside the hollow shaft;
    a lubricant feed ring arranged at a front face of the hollow shaft facing toward the sun gear of the planetary gear stages, said lubricant feed ring having a cone-shaped passage opening, said cone-shaped passage opening having an internal diameter which decreases in a direction of the sun gear of the at least one planetary gear stage and concentrically surrounds the sun shaft of the at least one planetary gear stage, and
    at least one lubricant feed nozzle aligned with a circumferential gap between the lubricant feed ring and the sun shaft of the at least one planetary gear stage for supplying lubricant to the denture clutch.

2. The gear train of claim 1, wherein the cone-shaped passage opening of the lubricant feed ring is formed by a section which widens in a direction of the denture clutch, and wherein lubricant injected into a gap between the lubricant feed ring and the sun shaft of the at least one planetary gear stage is conveyed through said section in the direction of the denture clutch.

3. The gear train of claim 1, wherein the at least one planetary gear stage and the gear train stage have a shaft orientation inclined downward toward a driven-side end relative to an installation surface.

4. The gear train of claim 1, wherein the denture clutch is formed by an external tooth system on the sun shaft of the at least one planetary gear stage and by an internal tooth system on the hollow shaft.

5. The gear train of claim 1, further comprising an insert ring arranged concentrically with the sun shaft of the at least one planetary gear stage in the gear train housing, and a lubricant distribution channel passing through the insert ring, said lubricant distribution channel being connected on one side to a lubricant pump and on another side to lubricant feed channels in the planetary carrier of the at least one planetary gear stage.

6. The gear train of claim 5, wherein the lubricant feed nozzle is mounted on the insert ring and has a connection to the lubricant distribution channel.

7. The gear train of claim 1, wherein the gear train stage is a spur gear stage including a spur gear which concentrically surrounds the hollow shaft, and wherein the hollow shaft is co-rotationally coupled to the spur gear.

8. The gear train of claim 1, wherein the gear train stage is another planetary gear stage, and wherein the hollow shaft is co-rotationally coupled to a planetary carrier of the another gear train stage.

9. The gear train of claim 8, wherein the hollow shaft is integrally formed in a single piece with the planetary carrier of the planetary gear stages.

10. A gear train for a wind turbine, comprising:
- a first planetary gear stage arranged at a driving side of the gear train and comprising an annulus gear, a planetary carrier, a plurality of planetary gears mounted in the planetary carrier, a sun gear and a sun shaft; said sun gear being arranged at an end of the sun shaft,
- a second planetary gear stage arranged adjacent said first planetary gear stage, wherein a hollow shaft is co-rotationally coupled to the planetary carrier of the second planetary gear stage and surrounds another end of the sun shaft of the first planetary gear stage;
- a gear train stage arranged at a driven side of the gear train and comprising another hollow shaft, said another hollow shaft surrounding another end of the sun shaft of the second planetary gear train;
- a gear train housing enclosing the first and second planetary gear stages and the gear train stage;
- a drive shaft connectable to a rotor hub, said drive shaft being co-rotationally coupled to the planetary carrier of the first planetary gear stage;
- a driven shaft connectable to a generator, said driven shaft being co-rotationally coupled to a toothed gearwheel of the gear train stage;
- denture clutches each having a tooth system and respectively co-rotationally coupling the sun shaft of the first planetary gear stage to the hollow shaft, and the sun shaft of the second planetary gear stage to the another hollow shaft, said tooth system being respectively arranged inside the hollow shaft and the another hollow shaft;
- lubricant feed rings arranged at respective front faces of the hollow shaft and the another hollow shaft which respectively face toward the sun gear of the first and second planetary gear stages, said lubricant feed rings each having a cone-shaped passage opening, said cone-shaped passage opening having an internal diameter which respectively decreases in a direction of the sun gears of the first and second planetary gear stages and concentrically surrounds the respective sun shafts of the first and second planetary gear stages, and
- at least one lubricant feed nozzle aligned with a circumferential gap between the lubricant feed rings and the sun shaft of the first and second planetary gear stages for supplying lubricant to the denture clutch.

* * * * *